United States Patent [19]
Heflinger

[11] 3,723,958
[45] Mar. 27, 1973

[54] ACOUSTIC IMAGING SYSTEM

[75] Inventor: Lee O. Heflinger, Torrance, Calif.

[73] Assignee: TRW Inc., Redondo Beach, Calif.

[22] Filed: Aug. 9, 1971

[21] Appl. No.: 170,124

[52] U.S. Cl.............340/5 MP, 73/67.5 R, 178/6, 332/7.51
[51] Int. Cl...............................................H04n 3/02
[58] Field of Search..........340/5 MP, 5 H; 332/7.51; 73/67.5 R, 67.6, 67.7, 67.5 H; 178/7.5 R, 7.5 D, DIG. 18, 6

[56] References Cited

UNITED STATES PATENTS

| | | | |
|---|---|---|---|
| 3,626,753 | 12/1971 | Aprahamian et al. | 340/5 H |
| 3,431,504 | 3/1969 | Adler | 332/7.51 |
| 3,585,848 | 6/1971 | Korpel | 73/67.5 H |

*Primary Examiner*—Richard A. Farley
*Attorney*—Daniel T. Anderson et al.

[57] ABSTRACT

An acoustic imaging system which is particularly useful at low sound levels. A light beam is made to pass twice through a region where the light can interact with the acoustic wave perturbed by the object. As a result a light image is created which is modulated at twice the acoustic frequency. Thus, a portion of the light has a frequency which is raised while another portion of the light has its frequency decreased by the acoustic frequency. Therefore, the modulated light may readily be segregated from the unmodulated light, for example, by a suitable bandpass filter. Because the scattered light does not disturb the image it is feasible to use a higher light intensity so that an optical image is obtainable even at low acoustic intensity. Furthermore, the resolution is improved because the system has a large aperture.

7 Claims, 2 Drawing Figures

Patented March 27, 1973

3,723,958

Lee O. Heflinger
INVENTOR

BY

ATTORNEY

ACOUSTIC IMAGING SYSTEM

BACKGROUND OF THE INVENTION

This invention relates generally to acoustic imaging systems.

Acoustic imaging systems are well known. Here a sound wave is generated which is perturbed by an object. The sound wave may either be reflected by the object or else the sound wave may be passed through an object transparent to the wound wave. A light beam is now made to pass through the perturbed sound wave so as to modulate the light by interaction with the sound wave. In this manner it is feasible to obtain an optical image representative of the sound wave perturbed by the object.

It is also known that the acoustic and the optical intensity of the two waves may be interchanged. Thus instead of using a higher acoustic field it is feasible to use a highly intense light beam. However, in that case the intensity of the scattered light is also very high and may make it impossible to obtain a clear image of the object.

It is accordingly an object of the present invention to provide an acoustic imaging system of the type where a good optical image is obtainable in the presence of a high intensity light beam with a resulting high intensity of the scattered light.

A further object of the invention is to provide a system for creating an image of an object illuminated with sound waves and characterized by a large aperture thereby to yield an improved resolution.

Another object of the present invention is to provide an acoustic imaging system which permits observation at very low acoustic intensities.

SUMMARY OF THE INVENTION

A system for providing an image of an object illuminated with sound waves in accordance with the present invention comprises a fluid within which the object is disposed. Generally the object will be arranged in a liquid. An acoustic generator is disposed in such a manner as to irradiate the object with a sound wave thereby to create a perturbed sound wave. The sound wave may pass through the object or may be reflected thereby. A light source for generating monochromatic light is disposed for interaction with the perturbed sound wave. There is further provided mirror means for reflecting the light from the light source and causing it to pass through the perturbed sound wave twice. As a result a portion of the light has a frequency increased by the acoustic frequency while another portion forming an identical image has its frequency decreased by the acoustic frequency. This arises because the light wave may be perturbed either during the outward pass of the light through the sound wave or through the return path through the sound wave. This in turn will create a light image by the reflection of the light. This image-carrying light is now scanned point by point in at least one or two directions. The scanned light is detected by a detector. At the output of the detector there appears a DC (direct-current) component, a modulation component at the acoustic frequency and a modulation component at twice the acoustic frequency. This component at twice the acoustic frequency arises from the beating between the light whose optical frequency was increased by the acoustic frequency with that whose optical frequency was decreased by the acoustic frequency. Further means are provided for segregating only that portion of the modulation component having a frequency of twice the acoustic frequency. This portion of the modulation component has an intensity corresponding to the light intensity of the image of the object. Stray and extraneous light yields a detector output either at DC or at the acoustic frequency which are easily removed from the desired image component at twice the acoustic frequency.

Thus, because the light wave passes through the interaction region twice, the modulation of the detector output from the image light appears at twice the acoustic frequency. The two images formed by each passage of the light through the interaction region coincide in the same area. This is due to the fact that the light is preferably reflected by a spherical mirror having its center at the origin of the light source.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
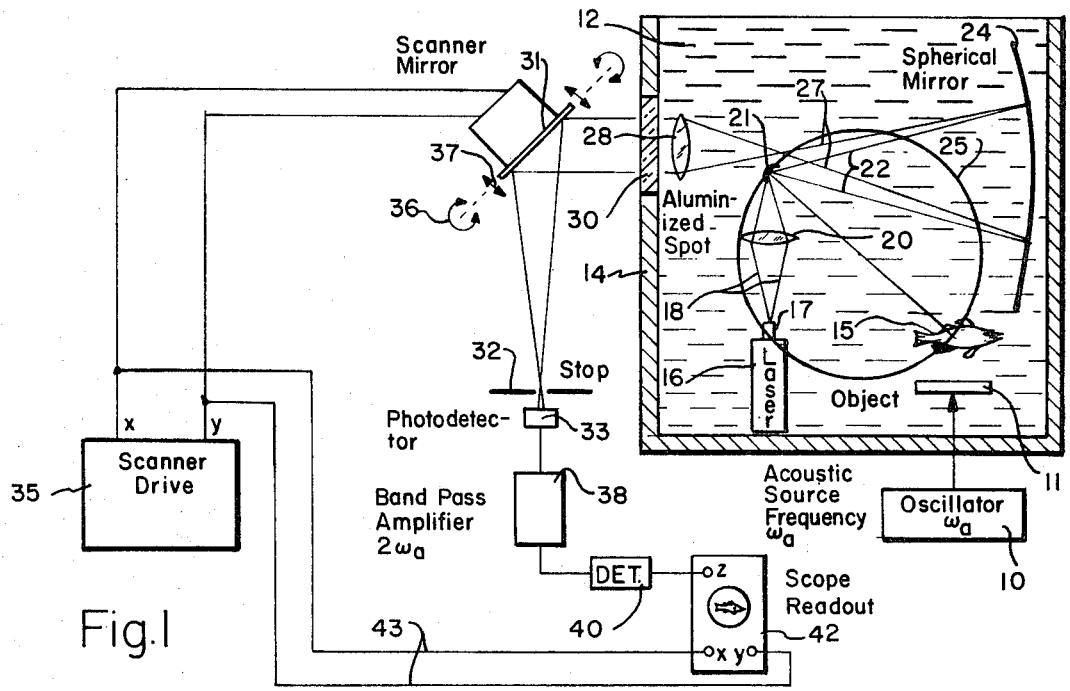
FIG. 1 is a cross-sectional view of the liquid in which optical and sound waves interact and a block diagram of the overall acoustic imaging system of the present invention.

The overall acoustic imaging system of the present invention is illustrated in FIG. 1 to which reference is now made. The geometry of the interaction region between the perturbed sound wave and the light wave is shown in more detail in FIG. 2. However, the overall system will first be described by reference to FIG. 1 before going into the details of the geometry of the interaction.

The system of FIG. 1 includes an oscillator 10 capable of generating an electrical oscillation at a frequency designated $\omega_1$ corresponding to the frequency of the desired sound wave. The oscillator 10 is coupled to an acoustic generator or transducer 11 for generating a sound wave at the frequency $\omega_a$ within a fluid such as a liquid 12. The liquid may be contained in a suitable container 14. The object to be imaged is shown at 15 suspended in a suitable manner in the liquid 12. Thus when the oscillator 10 is energized the transducer 11 will generate a sound wave which will be perturbed or scattered by the object 15 and which will radiate into the liquid 12. The object 15 may be transparent to sound or it may reflect the sound wave.

As is conventional in acoustic imaging systems, there is also provided a light source 16 for generating monochromatic light. This may, for example, be a laser 16 as shown which may include a suitable diverging lens in the reduced portion 17. However, it will be understood that any light source may be used which creates light which is sufficiently monochromatic so that it may produce the desired imaging with detectable modulations at twice the acoustic frequency $\omega_a$. The laser 16 may also be disposed in the liquid 12 or alternatively it may be arranged outside of the container 14 but in such a manner that the apparent point source or origin of the light is disposed within the liquid 12. To this end the diverging light beam 18 may be focused again by a focusing lens 20 at a suitable reflector which may be an alluminized spot 21. Thus, the reflector 21 now becomes the origin of the light source. The light now diverges as shown by the light beam 22 and impinges on a spherical mirror 24 which has its center at the reflector 21, that is at the origin of the light source. The important condition is that the apparent location of the point source of light 21 be at the center of the mirror 24. The location of the mirror 21 need not be right at the center, but for convenience will be near this point.

The light beam 22 now interacts with the perturbed sound wave, that is with the sound wave perturbed by the object 15, in a certain interaction region. This region may be generally defined by the circle 25, the end points of whose diameter are at the sound source 11 and the light source point 21.

Accordingly, the light of the light beam 22 is diffracted or reflected at the Bragg angle and is doppler shifted so that its light frequency is greater than the frequency of the source 16 by the acoustic frequency $\omega_a$. The Bragg angle is the glancing or scattering angle at the reflecting points of the sound wave perturbed by the object. The light which is thus scattered appears to emanate from a virtual image which is an aberrated acoustic image. This has been described in a paper by Korpel which appears in Applied Physics Letters, Vol. 9 No. 12, Dec. 15, 1966. This will be more fully described later on in connection with FIG. 2.

Subsequently, the light which was diffracted at the Bragg angle is reflected by the spherical mirror 24 and again passes through the interaction region. It now forms a real image in the neighborhood of the focal point of the reflected light beam 27.

Another image of the origin of the sound wave is again formed at the same real image by the light beam which goes directly to the spherical mirror 24 and is diffracted on its return trip at the Bragg angle. This light is now doppler shifted in such a manner that its frequency is lower than that of the laser 16 by the acoustic frequency.

This light image may now be focused by a lens 28. The focused light beam passes through a transparent window 30 in the container 14 and is reflected by a scanning mirror 31 past an apertured stop 32 into a photodetector 33.

The scanning mirror 31 may be driven by a suitable scanner drive 35 which will deflect in a periodic pattern the scanning mirror 31 both in the X and Y direction as shown by the two sets of arrows 36 and 37. Thus, the mirror 31 may be rotated to a certain angle to scan say the X direction and may be periodically moved in one direction as shown by the arrow 37 say in the Y direction. However, it will be understood that it is not necessary to scan in two directions but that for some purposes it may be sufficient to scan the optical image in one direction.

Each light point of the image which is being scanned at any instant by the scanner mirror 31 is received by the photodetector 33 which converts it into an electric signal. The light output received by the photodetector 33 does include components or portions shifted in frequency above and below the original frequency. The beat at the detector between these two components has twice the acoustic frequency and the RMS (root mean square) value of the beat is proportional to the intensity of the image point being scanned at that instant.

This signal corresponding to the desired light component may now be selected by a band pass filter and amplifier 38, the band pass filter having a pass band centered on $2\omega_a$. This will segregate the desired signal representation of the image from all other signals corresponding to light which may have been scattered by the object or by other obstacles in the path of the light beam. Actually, the detector signal also includes a direct-current component proportional to both image and scattered light.

In prior art systems it was this steady component that has been used to form images, which have the limitation of inability to distinguish scattered light (e.g. from dust in the water) from the true image light. It is one of the objects of this invention to permit improved performance in that the system is insensitive to the scattered light.

The electric signal passed by the band pass filter and amplifier 38 is not detected by the detector 40 and fed to an oscilloscope 42. As indicated by the leads 43 the oscilloscope 42 is coupled to the scanner drive 35 so as to position the electron beam of the oscilloscope to correspond with each point of the light image which is being scanned at that instance. The intensity of the signal obtained from the detector 40 controls the intensity of the electron beam.

Figure 2:
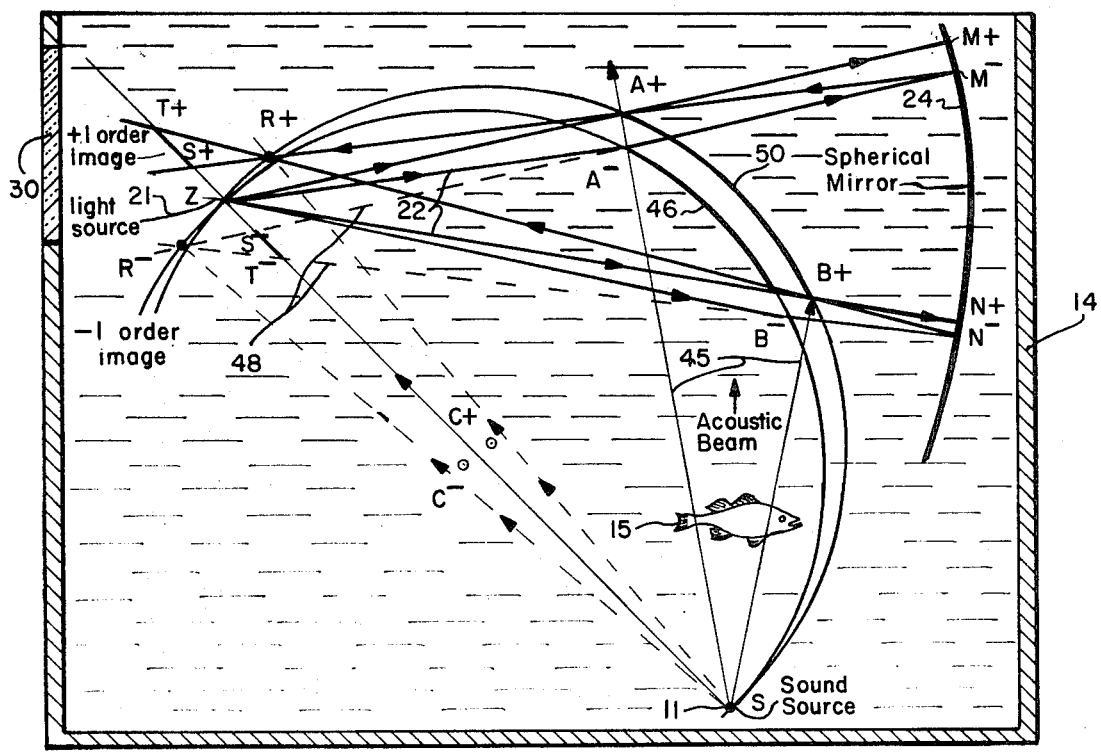
FIG. 2 is a cross-sectional view on an enlarged scale illustrating the geometry of the interaction area between sound and light waves and the reflecting spherical mirror.

Having now described the overall acoustic imaging system of the present invention, reference is made to FIG. 2 which illustrates on an enlarged scale the interaction region between sound and light waves. Thus, as shown in FIG. 2, the sound source illuminates the object 15 and creates an acoustic beam 45. For analysis this acoustic signal can be considered as the linear sum of many point sources of appropriate strengths. For illustration, one of these apparent point sources is designated by 11 and the process of formation of an optical image of this point source 11 will be described. The light source has its origin at 21 designated Z in FIG. 2 and creates the light beam 22. This light beam interacts with the sound wave from 11 along the circle 46 between the points $A^-$ and $B^-$. The portion of the circle 46 between $A^-$ and $B^-$ is the locus of points where the Bragg angle condition is satisfied and is thus the locus of points where the light is diffracted. As pointed out before, the diffracted light is shifted in frequency so that its optical frequency is increased by the acoustic frequency $\omega_a$. This will create a standard aberrated acoustic image which seems to emanate from the virtual image $R^-$, $S^-$ and $T^-$. Accordingly, a $-1$ order virtual image appears as shown at $R^-$, $S^-$, $T^-$.

The light wave then travels to the spherical mirror 24. It should be noted that the center of curvature of the spherical mirror 24 is at the origin 21 or Z of the light source. It should also be noted that the center of the circle 46 is at the point designated C⁻.

It should be noted that the diffracted light corresponding to the virtual image R⁻, S⁻, T⁻ appears to originate from the dotted lines 48 and hence is reflected from points N⁻ and M⁻ on the mirror 24 to form a real image on the opposite side of the source 21 at the points R⁺ S⁺ T⁺.

Another real and identical image of the sound source origin S is found at R⁺ S⁺ T⁺ by the light which goes directly to mirror 24, that is to points N⁺, M⁺. This light is diffracted on its return trip from the mirror 24 along the circle 50, that is between the points A⁺ and B⁺, forming a standard aberrated acoustic image at R⁺ S⁺ T⁺. The origin of the circle portion 50 is at point C⁺. The light of this other image is doppler shifted in such a manner that its frequency is lower than the laser frequency by the acoustic frequency, the images being identical in other respects.

Thus, the +1 order image or real image appears as shown at the points R⁺, T⁺ and S⁺. The two images R⁻, S⁻, T⁻ and R⁺, S⁺, T⁺ are imaged in the ratio 1 to 1. Therefore, the two images, that is the two +1 and −1 order images coincide. However, as pointed out before, the optical frequencies of the two images are separated from each other by twice the acoustic frequency. This is, of course, how the diffracted light can be distinguished from other light such as that which has been simply scattered or which corresponds to the zero order.

This real image which has just been described in connection with FIG. 2 is the one which is scanned by the scanner mirror 31 of FIG. 1 and which is being displayed on the scope 42.

It should be noted that in reality the opposite order of Bragg reflections also occur which give rise by an identical process to another real image at R⁻ S⁻ T⁻. This symmetry process has been omitted from the discussion in the interest of clarity and because it is practical to utilize only the image on one side of the source 21.

It should be noted that while FIGS. 1 and 2 show that the sound wave is transmitted through the object 15 which must be transparent to the sound it is also feasible to arrange the geometry such that the object actually scatters the sound waves and returns the sound rather than passing it.

While it has been stressed hereinbefore that the acoustic imaging system is particularly useful at lower acoustic levels it is not so limited. It obviously works equally well, if not better, at high acoustic levels.

It is also feasible to operate the system of the present invention at very high light intensity levels. This may be achieved by making the spherical mirror 24 one of the reflectors of the laser cavity, the other being contained in the housing 16. This is true because the zero order reflection returns to the point 21, that is, to the apparent origin of the light source. In that case the acoustic interaction region may be actually within the laser cavity which, of course, has a very high optical flux.

As indicated before, the acoustic imaging system of the invention is characterized by a large aperture which, of course, improves the resolution of the system.

There has thus been disclosed an improved acoustic imaging system. It is characterized in that it will operate at a low acoustic intensity level by permitting a high optical intensity level. This is made possible because the scattered light, as well as any zero order light, may be discriminated against by the fact that the desired diffracted light is shifted in frequency so as to produce a beat at the detector of twice the acoustic frequency. This permits a selection of the desired light by a simple band pass filter. The optical flux intensity may be made very high by making the reflecting spherical mirror part of the laser cavity so that the interaction region is at an area where the optical flux is very high. Also, the geometry is such that the system has a large aperture thus improving resolution.

What is claimed is:

1. A system for providing an image of an object illuminated with sound waves, said system comprising:

a fluid within which the object to be imaged is disposed;

an acoustic generator disposed for irradiating the object with a sound wave, thereby to create a perturbed sound wave;

a light source disposed for interaction with the perturbed sound wave, said light source generating monochromatic light;

a substantially spherical mirror for reflecting the light from said source and causing it to pass through the perturbed sound wave twice, whereby a portion of the light has its frequency shifted so that upon detection a frequency of twice the acoustic frequency is generated;

means for scanning point by point in at least one dimension the light image obtained by reflection of the light wave; and means including a detector for receiving the light and segregating only the modulation component having a frequency of twice the acoustic frequency, said modulation component having an intensity indicative of the image of the object.

2. A system as defined in claim 1 wherein said spherical mirror has its center at the origin of said light source.

3. A system for providing an image of an object illuminated with sound waves, said system comprising:

a liquid within which the object to be imaged is disposed;

an acoustic generator disposed in said liquid for irradiating the object with a sound wave, thereby to create a perturbed sound wave;

a laser including lens means for providing an apparent point light source disposed for interaction with the perturbed sound wave, said laser generating monochromatic light;

a spherical mirror for reflecting the light from said point light source and causing it to pass through the perturbed sound wave, whereby a portion of the light has a frequency shifted such that upon detection a frequency of twice the acoustic frequency is generated, said spherical mirror having its center at said point light source;

mirror means for scanning point by point in at least one dimension the light image obtained by reflection of the light wave;

a detector for receiving the light scanned by said mirror means to develop a signal; and means for segregating the signal portion having a frequency of twice the acoustic frequency and said signal portion having an intensity indicative of the image of the object.

4. A system as defined in claim 3 wherein said means for segregating includes a band pass filter for passing only said signal having a frequency shifted by twice the acoustic frequency.

5. A system as defined in claim 3 wherein said means for segregating includes an oscilloscope for visually exhibiting said signal portion having a frequency of twice the acoustic frequency to exhibit an image of the object.

6. A system as defined in claim 5 wherein a scanner drive is provided for scanning said mirror means and for deflecting the electron beam of said oscilloscope thereby to exhibit an image of the object.

7. A system as defined in claim 3 wherein said laser includes an optical cavity, one end of said cavity being defined by said spherical mirror.

* * * * *